Jan. 8, 1929.
A. C. NICKELL, JR
1,698,199
GEAR SHIFT
Filed June 26, 1925
2 Sheets-Sheet 1
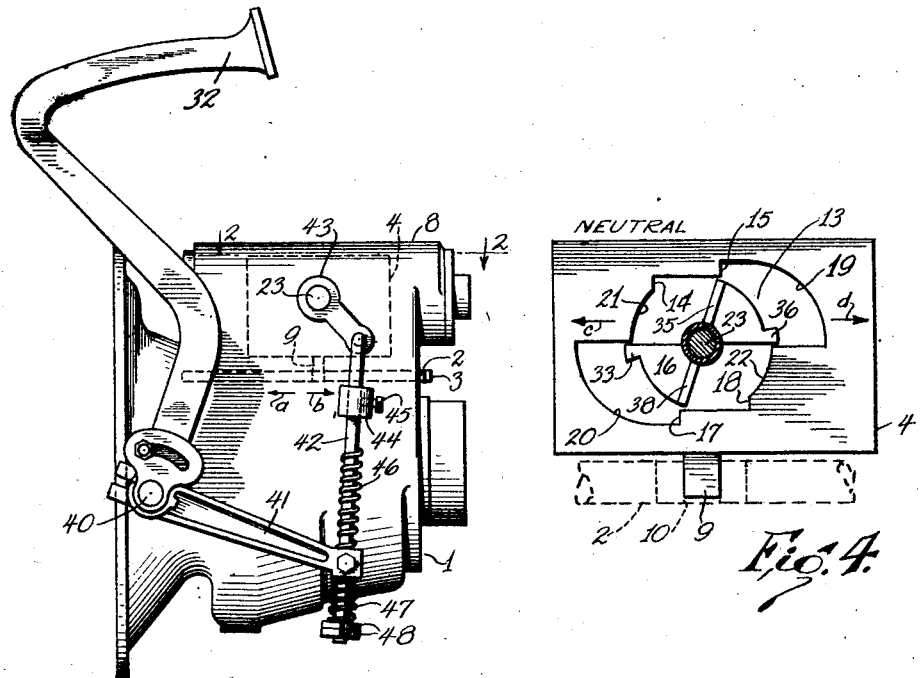
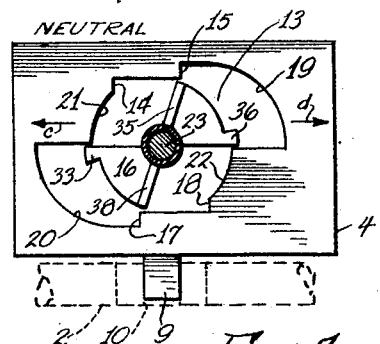
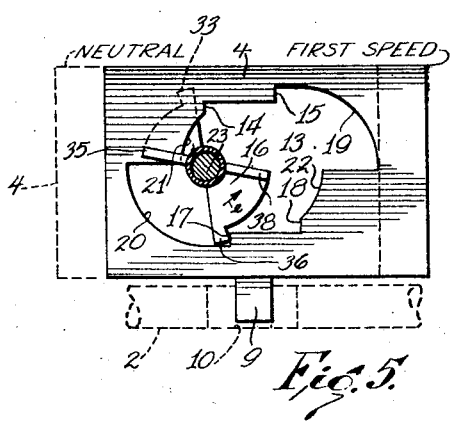
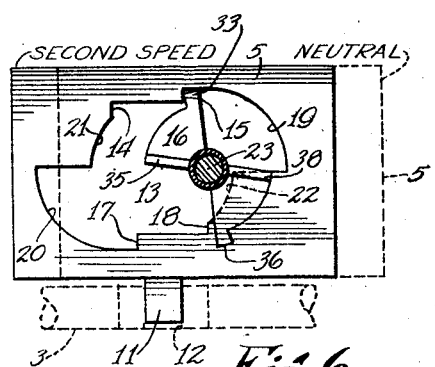
INVENTOR
A.C.Nickell Jr.
BY
ATTORNEYS

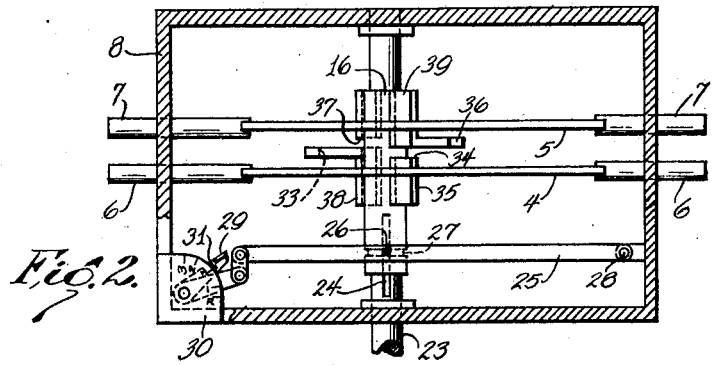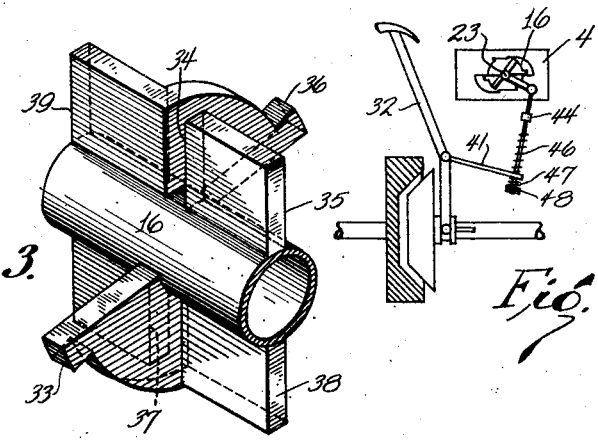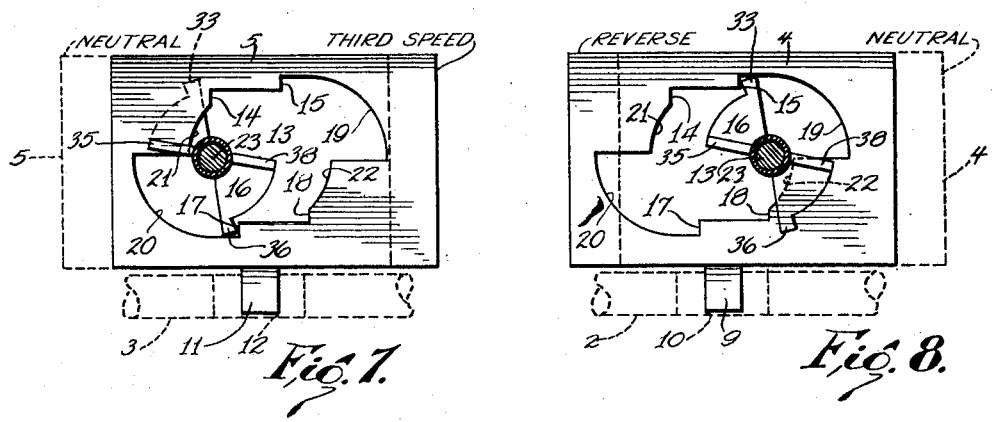

Patented Jan. 8, 1929.

1,698,199

UNITED STATES PATENT OFFICE.

ARTHUR CORNWALL NICKELL, JR., OF WAUKESHA, WISCONSIN.

GEAR SHIFT.

Application filed June 26, 1925. Serial No. 39,787.

My invention relates to improvements in gear shifts, and it consists in the combinations, constructions, and arrangements herein described and claimed.

An object of my invention is to provide an improvement over Patent No. 1,255,933 of February 12, 1918. In said patent there is shown a clutch pedal that is adapted to be moved so as to release the clutch, this constituting the first action; the section action of the clutch pedal being to throw the gear shifting mechanism to neutral position; and the third action being to throw the gear shifting mechanism to a desired position, this last movement taking place only when the clutch pedal is fully depressed, whereupon a release of the clutch pedal will drive the car at the speed thus selected.

In the present form of the device I show resilient means for causing the gears to be shifted from speed to speed, whereby the gears are adapted to be first aligned with each other before they are moved into engagement with each other, thus eliminating any chance of stripping the gears.

A further object of my invention is to provide a device of the type described in which novel means is provided for varying the tension of the resilient means that is employed for moving the gears into the different speeds.

A further object of my invention is to provide a device of the type described which can be readily applied to a standard transmission mechanism without altering the construction of the latter, the device being provided with lugs that engage with the two gear shifting rods in the transmission casing, these lugs taking the place of the usual gear shift lever.

Other objects and advantages will appear in the following specification, and the novel features of the invention will be particularly pointed out in the appended claims.

My invention is illustrated in the accompanying drawings, forming part of this application, in which Figure 1 is a side elevation of the device and is shown operatively applied to a transmission mechanism, Figure 2 is a section along the line 2—2 of Figure 1, Figure 3 is a perspective view of the selective means for shifting the gears, Figures 4 to 8 inclusive are views showing the parts of the device when shifting the gears into first, second, third or reverse speeds, and Figure 9 is a diagrammatic view showing the device in a position to permit the shifting of the gear changing mechanism, and also showing the clutch in released position.

In carrying out my invention I make use of a standard transmission mechanism 1 that employs the usual rods 2 and 3 for shifting the gears, not shown, within the transmission casing. The rods 2 and 3 function in the normal manner. For example when the rod 2 is moved in the direction of the arrow $a$ shown in Figure 1, the gears within the transmission casing will be shifted into reverse speed. In like manner when the rod 2 is moved in the direction of the arrow $b$ it will move the gears into first speed. The rod 3 when moved in the direction of the arrow $a$ will move the gears into second speed and when moved in the direction of the arrow $b$ will move the gears into third speed. It will be seen from the description thus far that the device operates in the same way as a standard transmission mechanism.

Instead, however, of a gear shifting lever being provided as is usually the case, I provide two gear shifting devices or slides 4 and 5 that are disposed parallel with each other and that are provided with aligned rods 6—6 and 7—7, these rods being slidably received in the casing 8 that houses the gear shifting mechanism. The slide 4 carries a lug 9 that is received in the standard recess 10 provided in the rod 2. In like manner the slide 5 carries a lug 11 that is received in the standard recess 12 provided in the rod 3. The lugs 9 and 11 take the place of the gear shift lever and are adapted to move the rods 2 and 3 in the same way as the gear shift lever. The lugs 9 and 11 are always received within the recesses 10 and 12 whereas in the standard gear shift mechanism the gear shifting lever is either disposed in neutral i. e., in a position between the two rods 2 and 3 or is received in either one of the recesses 10 and 12.

The slides 4 and 5 are adapted to be moved in identically the same manner as the gear shift lever is moved when being actuated so as to move the gears from speed to speed. The slides 4 and 5 are identical in shape and therefore the description of one of these slides will suffice for both.

In Figure 4 I show the slide 4 and it will be noted that this slide has an opening 13 therein that is of a predetermined shape. The opening is provided with two shoulders 14 and 15 that are adapted to have a slide moving member indicated generally a 16 to contact therewith so as to move the slide in the direction of the arrow $c$ in Figure 4. The opening 13 is also provided with two shoulders 17 and 18 that are adapted to have the member 16 contact therewith so as to move the slide 4 in the direction of the arrow $d$ in Figure 4. The rest of the opening 13 is shaped so as to permit the free movement of the member 16 therethrough, the portions 19, 20, 21 and 22 being provided for this purpose.

I will now describe the means for moving the member 16 into a predetermined position with respect to the slides 4 and 5 and then for rocking the member 16 about its axis so as to actuate either one or both of the slides 4 and 5. The selective gear shift determining means or selector 16 is slidably mounted upon a shaft 23 and is keyed thereto at 24. The means for sliding the member 16 upon the shaft 23 is shown in Figure 2. In the present form of the device this means comprises an arm 25 that has a pin 26 that is slidably received within a groove 27 in the member 16. The arm is pivotally secured to the casing at 28 and has its free end operatively connected to a control lever 29. A movement of the lever 29 will shift the member 16 along the shaft 23 so as to position the member with respect to the slides 4 and 5. The lever 29 may be disposed in any suitable position such as adjacent to the steering wheel, not shown, of the car. I have shown the lever 29 as being disposed adjacent to the casing 8 merely for illustrating the operation of the device more clearly. The lever 29 is mounted adjacent to a plate 30 upon which the letters R, 1, N, 2 and 3 are disposed, these letters indicating reverse, first speed, neutral, second speed, and third speed. The plate 30 is provided with notches or grooves not shown that are adapted to receive a projection 31 carried by the lever 29 whereby the lever is readily positioned with respect to any one of the different speeds and is held in this position. Obviously any other means for holding the lever 29 in adjusted position may be provided without departing from the spirit and scope of my invention.

Assume that the driver wishes to shift from neutral to first speed. When the slides 4 and 5 are in neutral position, they will be disposed directly in back of each other so as to cause the slide 4 to hide the slide 5 as is shown in Figure 4. The member 16 is in the position shown in Figure 4 when it is in normal position. In shifting from neutral position into first speed the member 16 is swung in the direction of the arrow $e$ so as to position the member in the full line position shown in Figure 5. The swinging of the member 16 is caused by the rocking of the shaft 23 which in turn is actuated by means of the clutch operating device such as a clutch pedal 32 in a manner hereinafter described. The swinging of the member 16 brings the projection 36 of the member into engagement with the shoulder 17 of the slide 4. The projection moves the slide from the dotted line position into the full line position shown in Figure 5, the dotted line position indicating the neutral position of the slide, while the full line position indicates first speed. Obviously movement of the slide from the dotted line position into the full line position will move the rod 2 which in turn will cause the gears, not shown, within the transmission mechanism to be shifted into first speed. The member 16 is provided with a slot 34 to permit the member to receive the slide 4 as shown in Figure 5.

It will be understood that any time after the clutch pedal has been released to bring the clutch into engaging position, the driver may swing the lever 29 into any other position. Therefore, after the car has attained the required speed while in first speed position, the driver may swing the lever 29 into second speed position. It will be noted that the openings 13 in the slides 4 and 5 are designed so as to permit the member 16 to be shifted from first speed into second speed without in any way affecting the movement of the slides. In other words, the lever 29 may be in second speed position while the car is still in first speed position. The change from first speed to second speed is effected by depressing the clutch pedal 32.

Movement of the clutch pedal will of course release the clutch so as to permit the gears to be shifted from first speed to second speed. The first rotative movement of the member 16 will cause the cam 35, see Figure 3, to contact with the shoulder 14 of the slide 4 so as to return the slide 4 to neutral position. As soon as the slide 4 reaches neutral position, the cam 35 has moved clear of the shoulder 14. Further movement of the member 16 will merely swing the cam 35 in the portion 21 of the slide 4 and will therefore cease to move the slide 4. This further movement of the member 16 is used however for shifting the slide 5 from the dotted line position shown in Figure 6, i. e., neutral position into full line position. The projection 36 contacts with the shoulder 15 of the slide 5 to cause this movement. The slot 37 receives the slide 5 during the movement of the member 16 and permits this movement. It will be seen from this construction that the member 16 in shifting the gears from first speed to second speed moves the slides 4 and 5 in such a manner as to first shift the gears into neutral position and then shift the gears into second speed. This operation is identical to the way the gears are shifted when the gear shift lever is used.

In shifting from second speed to third speed the slide 4 remains in neutral position while the slide 5 is moved from second speed position to neutral position and thence to third speed position. The movement of the slide 4 from second speed position to neutral position is caused by the cam 38 contacting with the shoulder 18 on the slide 5. As soon as the cam 38 rides free of the shoulder and is received in the portion 22 of the opening 13, the projection 33 will contact with the shoulder 17 so as to continue to move the slide 5 until the slide effects the engagement of the third speed gears within the transmission casing.

In shifting from third speed to reverse speed the member 16 is first moved along the shaft 23 into the desired position. The member 16 is now rocked so as to bring the cam 39 into contact with the shoulder 14 on the slide 5 so as to move the slide into neutral position. Further movement of the member 16 will bring the projection 36 into contact with the shoulder 15 on the slide 4, thus moving the slide 4 into reverse speed.

I have described how the member 16 is adapted to be shifted and then rocked so as to move the gears into any speed desired. The means for rocking the shaft 23 consists of the clutch pedal 32 as heretofore described. The clutch pedal 32 is mounted upon a shaft 40 that in turn is connected to the clutch, not shown. An arm 41 is mounted upon the shaft 40 and has its free end slidably mounted upon a rod 42. This rod is connected to the shaft 23 by means of an arm 43. A collar 44 is mounted upon the rod 42 and is adjustably secured thereto by a set screw 45. A heavy coil spring 46 is slidably mounted upon the rod 42 and is adapted to be moved against the collar 44 when the clutch pedal 32 is actuated. This movement of the spring 46 takes place before the clutch pedal 32 will rock the shaft 23. In this way I provide a simple means for causing the clutch pedal to first partially release the clutch before it will rock the member 16. After the coil spring 46 has engaged with the collar 44 the further movement of the clutch pedal 32 will cause the spring 46 to move the rod 42 and rock the shaft 23. It will be seen at this point that there is a yielding connection between the clutch pedal 32 and the shaft 23. If therefore the shaft 23 moves either of the slides 4 or 5 so as to cause the slides to shift the gears into the desired speed, and the gears fail to mesh properly, the spring 46 will permit the clutch pedal 32 to be moved into its furthest position without forcing the gears to mesh, yet at the same time will cause the gears to instantly mesh when the teeth on the gears align with each other. In this way I provide a simple means for preventing the stripping of the gears when the gears are shifted from speed to speed. A fine adjustment of the resilient means for effecting the engagement of the gears is provided by means of a weak coil spring 47 that is held in position by means of lock nuts 48. By turning the lock nuts 48, the spring 47 will move the arm 44 on the rod 42 so as to bring the free end of the spring 46 into the desired position with respect to the collar 44.

From the foregoing description of the various parts of the device, the operation thereof may be readily understood. I have shown how the member 16 is adapted to shift the gears into any desired speed and when shifting the gears, to first bring the gears into neutral position before moving them into the desired speed. I have further shown how the clutch pedal 32 is first adapted to be moved so as to partially release the clutch before causing the member 16 to shift the gears from one speed to the next. I have still further shown how the member 16 is adapted to be moved along the shaft 23 without in any way affecting the movement of the slides 4 and 5.

The principal object of the invention however is to provide the resilient means that connects the shaft 23 with the clutch pedal 32, whereby the gears are adapted to be shifted into the various speeds by a means that will cause the gears to mesh as soon as the teeth on the gears are aligned with each other, yet at the same time will not force this engagement before the teeth are aligned with each other. In this way the stripping of the gears is avoided. This yielding means may be adjusted either by the collar 44 or by the lock nuts 48 so as to vary the tension at which the moving gear is brought into meshing engagement with the stationary gear when shifting from speed to speed. It should be noted that the rods 2 and 3 are provided with the usual means for preventing the movement of one rod until the other rod has first been brought into neutral position. This means is usually provided on standard transmission mechanisms and is therefore not shown. While I have spoken of the varying of the tension at which the moving gear is brought into meshing engagement by shifting the position of the collar 44 or the lock nuts 48, it will be understood that when the clutch pedal is adjusted to take up any wear in the clutch, the members 44 and 48 form means for compensating for such adjustment.

It might happen that the driver releases the clutch while the gears are in third speed or any other speed. Some means must be provided for permitting the member 16 to be swung into a position so as to be moved from speed to speed while the clutch is still held in released position.

In Figure 9, I have shown the parts arranged so as to still keep the clutch released while permitting the member 16 to be moved into any speed desired. The operator to bring the member 16 into such a position allows the clutch pedal to return to practically normal position. The clutch pedal in this position still keeps the clutch in disengagement. The control handle 29 may be moved into any speed desired while still the clutch is in released position. If the driver wishes the gears to be thrown into neutral position, he may do so and then entirely release the clutch, or he may shift the gears into any speed desired and release the clutch. In this way the driver is enabled to change into any speed desired after releasing this clutch, thereby obviating the necessity of stopping his engine in order to move the member 16 into the desired position.

I claim:

1. In an automatic gear shifting mechanism, the combination with a clutch-actuating shaft arranged to be actuated by a clutch pedal, of an arm having one end rigidly mounted upon said clutch-actuating shaft, a rod extending through the other end of said arm, a compression spring disposed upon each side of said arm and concentric with said rod, adjusting means for varying the tension of said springs, a cam shaft, a lever having one end rigidly mounted upon said cam shaft and the other end pivotally secured to one end of said rod, and a selective device operatively connected to said cam shaft for shifting gears from neutral positions into operative positions, said selective device including two parallel disposed slides having openings therein identical in contour, said openings having central contact neutral surfaces which are radially disposed about a common center and recesses radially disposed about centers positioned upon each side of the common center and in alignment therewith.

2. In an automatic gear shifting mechanism, the combination with a clutch-actuating shaft arranged to be actuated by a clutch pedal, of an arm having one end rigidly mounted upon said clutch-actuating shaft, a rod extending through the other end of said arm, a compression spring disposed upon each side of said arm and concentric with said rod, adjusting means for varying the tension of said springs, a cam shaft, a lever having one end rigidly mounted upon said cam shaft and the other end pivotally secured to one end of said rod, and a selective device operatively connected to said cam shaft for shifting gears from neutral positions into operative positions, said selective device including two parallel disposed slides having openings therein identical in contour, said openings having central contact neutral surfaces which are radially disposed about a common center and recesses radially disposed about centers positioned upon each side of the common center and in alignment therewith, the walls of said openings being provided with shoulders disposed adjacent said neutral surfaces.

3. In an automatic gear shifting mechanism, the combination with a clutch-actuating shaft arranged to be actuated by a clutch pedal, of an arm having one end rigidly mounted upon said clutch-actuating shaft, a rod extending through the other end of said arm, a compression spring disposed upon each side of said arm and concentric with said rod, adjusting means for varying the tension of said springs, a cam shaft, a lever having one end rigidly mounted upon said cam shaft and the other end pivotally secured to one end of said rod, a selective device operatively connected to said cam shaft for shifting gears from neutral positions into operative positions, said selective device including two parallel disposed slides having openings therein identical in contour, said openings having central contact neutral surfaces which are radially disposed about a common center and recesses radially disposed about centers positioned upon each side of the common center and in alignment therewith, the walls of said openings being provided with shoulders disposed adjacent said neutral surfaces, and a slide-moving member keyed to said cam shaft and arranged to engage with the walls of the openings in said slides for moving said slides for moving the gears into their various positions.

4. In an automatic gear shifting mechanism, the combination with a clutch-actuating shaft arranged to be actuated by a clutch pedal, of an arm having one end rigidly mounted upon said clutch-actuating shaft, a rod extending through the other end of said arm, a compression spring disposed upon each side of said arm and concentric with said rod, adjusting means for varying the tension of said springs, a cam shaft, a lever having one end rigidly mounted upon said cam shaft and the other end pivotally secured to one end of said rod, a selective device operatively connected to said cam shaft for shifting gears from neutral positions into operative positions, said selective device including two parallel disposed slides having openings therein identical in contour, said openings having central contact neutral surfaces which are radially disposed about a common center and recesses radially disposed about centers positioned upon each side of the common center and in alignment therewith, the walls of said openings being provided with shoulders disposed adjacent said neutral surfaces, a slide-moving member keyed to said cam shaft, means for moving said slide-moving member with respect to said slides, and cam portions of said slide-moving member arranged to engage with said shoulders for moving said slides for moving said gears into neutral positions.

5. In an automatic gear shifting mechanism, the combination with a clutch-actuating shaft arranged to be actuated by a clutch pedal, of an arm having one end rigidly mounted upon said clutch-actuating shaft, a rod extending through the other end of said arm, a compression spring disposed upon each side of said arm and concentric with said rod, adjusting means for varying the tension of said springs, a cam shaft, a lever having one end rigidly mounted upon said cam shaft and the other end pivotally secured to one end of said rod, a selective device operatively connected to said cam shaft for shifting gears from neutral positions into operative positions, said selective device including two parallel disposed slides having openings therein identical in contour, said openings having central contact neutral surfaces which are radially disposed about a common center and recesses radially disposed about centers positioned upon each side of the common center and in alignment therewith, the walls of said openings being provided with shoulders disposed adjacent said neutral surfaces, a slide-moving member keyed to said cam shaft, means for moving said slide-moving member with respect to said slides, cam portions of said slide-moving member arranged to engage with said shoulders for moving said slides for moving said gears into neutral positions, shoulders formed by the walls of said openings and disposed adjacent the recesses therein, and lug portions of said slide-moving member arranged to engage with said second named shoulders for moving said slides for moving said gears into operative positions.

ARTHUR CORNWALL NICKELL, JR.